(12) United States Patent
Curzan

(10) Patent No.: US 8,446,183 B2
(45) Date of Patent: May 21, 2013

(54) HIGH CURRENT EMITTER DRIVE UNIT CELL

(75) Inventor: Jon Paul Curzan, Arroyo Grande, CA (US)

(73) Assignee: Nova Research, Inc., Solvang, CA (US)

( * ) Notice: Subject to any disclaimer, the term of this patent is extended or adjusted under 35 U.S.C. 154(b) by 490 days.

(21) Appl. No.: 12/822,950

(22) Filed: Jun. 24, 2010

(65) Prior Publication Data

US 2010/0327918 A1 Dec. 30, 2010

Related U.S. Application Data

(60) Provisional application No. 61/220,454, filed on Jun. 25, 2009.

(51) Int. Cl.
*H03K 3/00* (2006.01)

(52) U.S. Cl.
USPC .......................................................... 327/108

(58) Field of Classification Search ........................ None
See application file for complete search history.

(56) References Cited

U.S. PATENT DOCUMENTS

2002/0032893 A1 * 3/2002 Brooks et al. ...................... 716/1

* cited by examiner

*Primary Examiner* — Daniel Rojas
(74) *Attorney, Agent, or Firm* — Felix L. Fischer

(57) ABSTRACT

A unit cell for a Read-In Integrated Circuit employs a signal sampling circuit with a voltage input controlled by a first switch, a capacitor charged by the voltage input and a linear amplifier connected to the capacitor. An output through a second switch samples the capacitor as the input signal for a transistor cascade for emitter current supply incorporating a first transistor receiving the input signal and a second transistor serially connected to the first transistor with a parallel resistor. The second transistor is maintained in saturation for a first portion of the input signal range with the first transistor acting as a source follower for that range. Linear current flow through the resistor results allowing high resolution control in the low current range. The second transistor departs saturation in a second portion of the range for the input signal resulting in saturation mode square-law behavior dominating the first transistor which, in turn, causes a rapid increase in current through its channel in response to higher input signal level thereby allowing a lower resolution but higher current for emitter drive at higher temperatures.

10 Claims, 6 Drawing Sheets

US 8,446,183 B2

HIGH CURRENT EMITTER DRIVE UNIT CELL

REFERENCE TO RELATED APPLICATIONS

This application claims priority of U.S. Provisional Application Ser. No. 61/220,454 filed Jun. 25, 2009 entitled HIGH CURRENT EMITTER DRIVE UNIT CELL and having a common inventor herewith.

BACKGROUND INFORMATION

1. Field

Embodiments of the disclosure relate generally to the field of read-in integrated circuits (RIIC) for infrared emitters and more particularly to embodiments for providing high current output from a RIIC unit cell consistent with high current emitters while maintaining linear control output from the RIIC unit cell with high resolution at low temperature and reduced resolution at high temperature of the emitter.

2. Background

Infrared detection and imaging systems are being employed to sense extreme high temperatures. This provides a challenge for current Read-In Integrated Circuit (RIIC) unit cells typically employed in infrared scene projection system architectures for the purpose of simulating dynamically changing infrared scenes. Increasing RIIC unit cell emitter output current to the levels desired for extreme higher temperatures normally requires the sacrifice of resolution at lower temperatures, since a fixed number of quantized levels (using digital-to-analog converted control bits) is available to cover the entire emitter output current range.

Additionally, technology in development for emitters that will take advantage of larger RIIC unit cell output currents requires applied voltages that are larger than standard submicron Complementary Metal Oxide Semiconductor (CMOS) process devices can tolerate.

It is therefore desirable to provide RIIC unit cells which maintain higher resolution at low temperatures, while still allowing the emitter to reach extreme high temperatures with lower resolution. It is also desirable to provide a RIIC having high current output capability for enhanced emitter operation but retain linear control characteristics. It is further desirable that the RIIC unit cell be able to tolerate applied voltages consistent with new emitter technology.

SUMMARY

Exemplary embodiments provide a unit cell for high current emitter drive in a Read-In Integrated Circuit. A signal sampling circuit is employed to create a variable input signal having a desired range. A transistor cascade for emitter current supply employs a first transistor receiving the input signal and a second transistor serially connected to the first transistor with a parallel resistor. The second transistor is maintained in saturation for a first portion of the input signal range with the first transistor acting as a source follower for that range. Linear current flow through the resistor results allowing high resolution control in the low current range. The second transistor departs saturation in a second portion of the range for the input signal resulting in saturation mode square-law behavior dominating the first transistor which, in turn, causes a rapid increase in current through its channel in response to higher input signal level thereby allowing a lower resolution but higher current for emitter drive at higher temperatures.

The signal sampling circuit for the unit cell incorporates a voltage input controlled by a first switch, a capacitor charged by the voltage input and a linear amplifier connected to the capacitor. An output through a second switch samples the capacitor as the input signal for the first transistor.

The features, functions, and advantages that have been discussed can be achieved independently in various embodiments of the present invention or may be combined in yet other embodiments further details of which can be seen with reference to the following description and drawings

DETAILED DESCRIPTION

Figure 1:
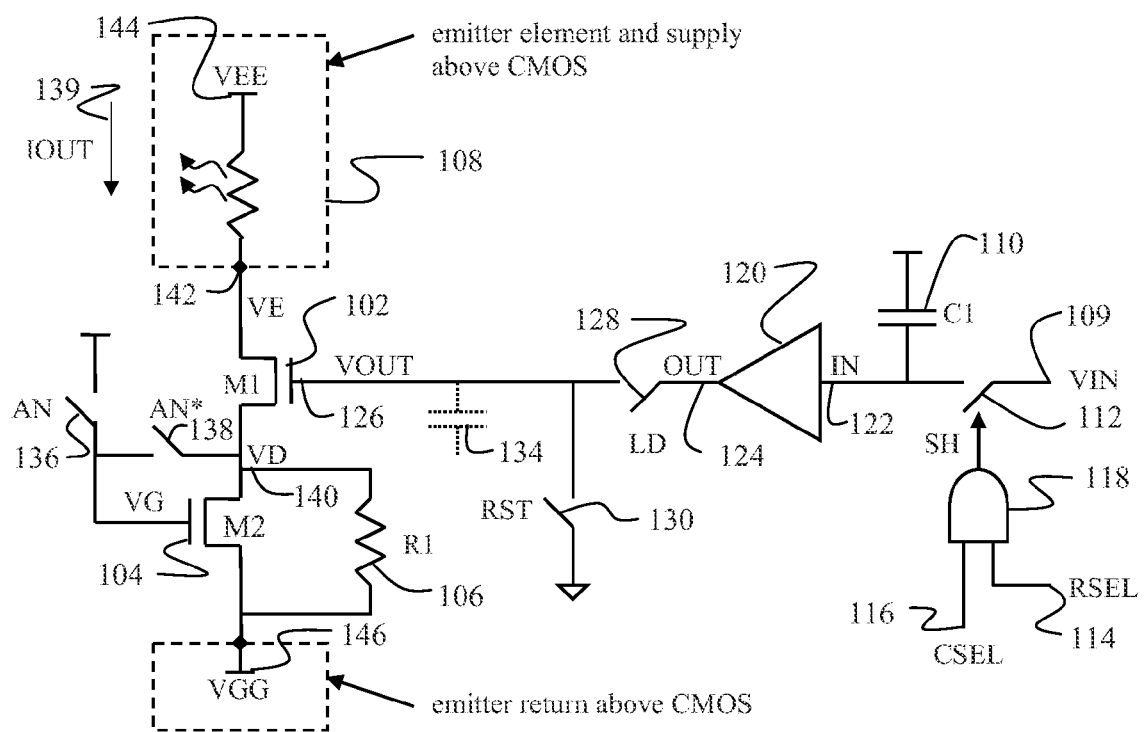
FIG. 1 is a schematic of a generalized unit cell of an exemplary embodiment.

The embodiments described herein demonstrate a Read-In Integrated Circuit (RIIC) unit cell and associated high current emitter. As generally described in FIG. 1, transistors M1 102, M2 104 and resistor R1 106 function together to control the output current IOUT of emitter 108 relative to an input voltage VIN 109. VIN is sampled and held on capacitor C1 110 when switch SH 112 is closed, i.e., both row selection (RSEL) signal 114 and column selection (CSEL) signal 116 are enabled through AND gate 118. RSEL and CSEL provide row and column selection, respectively, of the unit cell in the sensor array. Charge on capacitor C1 is then buffered through a unity gain amplifier 120 as an input on node IN 122. Output from the amplifier, node OUT 124, is allowed to charge node VOUT 126 when switch LD 128 is closed to sample the emitter. LD is an externally-generated control signal that occurs on a unit cell row basis (for line snapshot operation) or unit cell array basis (for frame snapshot operation), where "snapshot" refers to the simultaneous updating of emitter drive currents.

Switch RST 130 is available to immediately reset the entire unit cell array to zero drive current, i.e. all emitters off, by dumping the control voltage on gates of transistor M1 to the negative rail. This should not occur during normal operation since it would interrupt the desired continuous-time-sampled emitter drive sequence; RST primarily acts as a power-on or operational fail-safe to inhibit emitter drive current. When RST is activated from an external control, LD is deactivated to prevent shorting the amplifier output.

Parasitic capacitance of the circuit influencing node VOUT 132 is represented by capacitor 134. Due to the large gate geometry of transistor M1 in the exemplary embodiment, an explicit capacitor is not needed to sample and hold node OUT onto node VOUT; instead, the parasitic gate capacitance of M1 is used. Assuming switch LD resistance is negligible, the time-constant consisting of this parasitic capacitance for a given amplifier bias current, set as will be described subsequently by transistor 420 in FIG. 4A for example, limits the unit cell's response time or maximum frequency.

During normal unit cell operation, switch AN 136 is open and switch AN* 138 is closed thus configuring M2 into saturation mode when current through the emitter, IOUT (represented by arrow 139) equals zero, voltage at node VD 140 is equal to zero and voltage at node VE 142 is equal to the emitter element supply voltage, VEE 144. This condition occurs when VOUT at the gate of M1 is below the threshold voltage for this transistor relative to node VD, i.e., VOUT−VD<VTH(M1). As node VOUT increases, M1 acts as a source follower and this voltage increase is conveyed onto node VD. This in turn causes a current to flow through R1 in linear proportion to its conductance. M2 will remain in cut-off, i.e., virtually no current will flow through its channel, as long as node VG(=VD) remains below the threshold voltage for this transistor, VTH(M2), relative to node VGG 146.

As node VOUT increases further, M2 eventually turns on since VG rises above its threshold voltage due to the potential generated by R1 at node VD with increasing current. When this happens, current is shared by both R1 and M2 but the current through the transistor follows square-law behavior and slows the rise of VD. This alters the source follower behavior of M1 such that its own saturation mode square-law behavior dominates, causing a rapid increase in current through its channel. The transconductances of M1 and M2 are roughly equivalent by design and M1 now essentially limits the total output current IOUT. Current continues to increase in this manner through M1 as VOUT increases until M1 falls out of saturation mode due to VE−VD falling below drain saturation voltage for M1 (VDSAT(M1)). Only the drain of M1 is allowed to contact node VE due to the high voltage that may be present there. Additionally, the circuit is constructed to purposefully not draw charge from node VOUT since that would cause undesired emitter decay between frames.

The resulting control parameters can be summarized to a first order as for VOUT<VTH(M1), IOUT=0;

for VTH(M1)<VOUT<VTH(M1)+VTH(M2), IOUT=VD/R1; and for VOUT>VTH(M1)+VTH(M2), IOUT=VD/R1+(Beta/2)(VOUT−VTH(M1)−VTH(M2))^2;

where VTH is the threshold voltage of transistors M1 and M2, VD=VOUT−VTH(M1), Beta is the transconductance parameter for M1 and VGG=0. The above equations ignore body effect on VTH(M1) and simplify M2's affect on node VD as it saturates. Also not included is a current reduction factor that is due to M1's large drain resistance as will be discussed in greater detail subsequently.

Figure 2A:
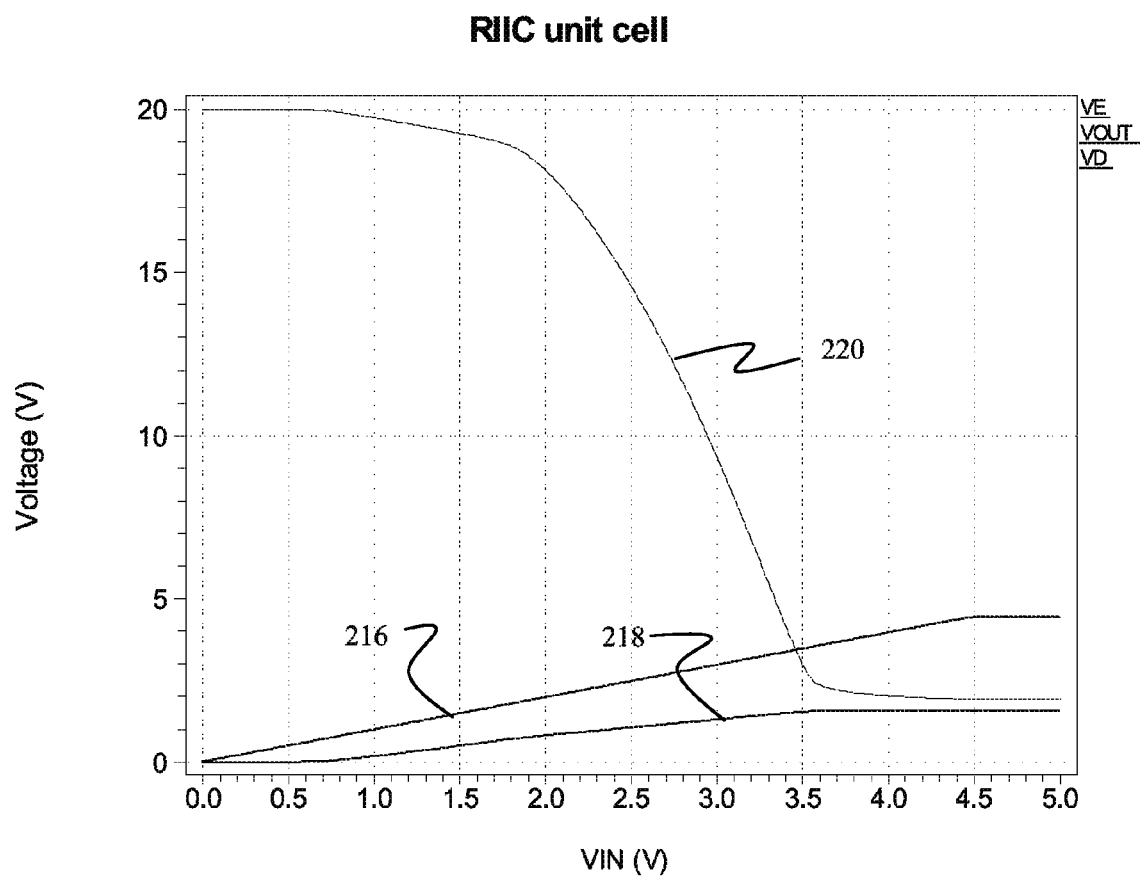
FIG. 2A is a graph of voltages of a linear input buffer driving node with the resulting drain node voltages on the two drive transistors.
Figure 2B:
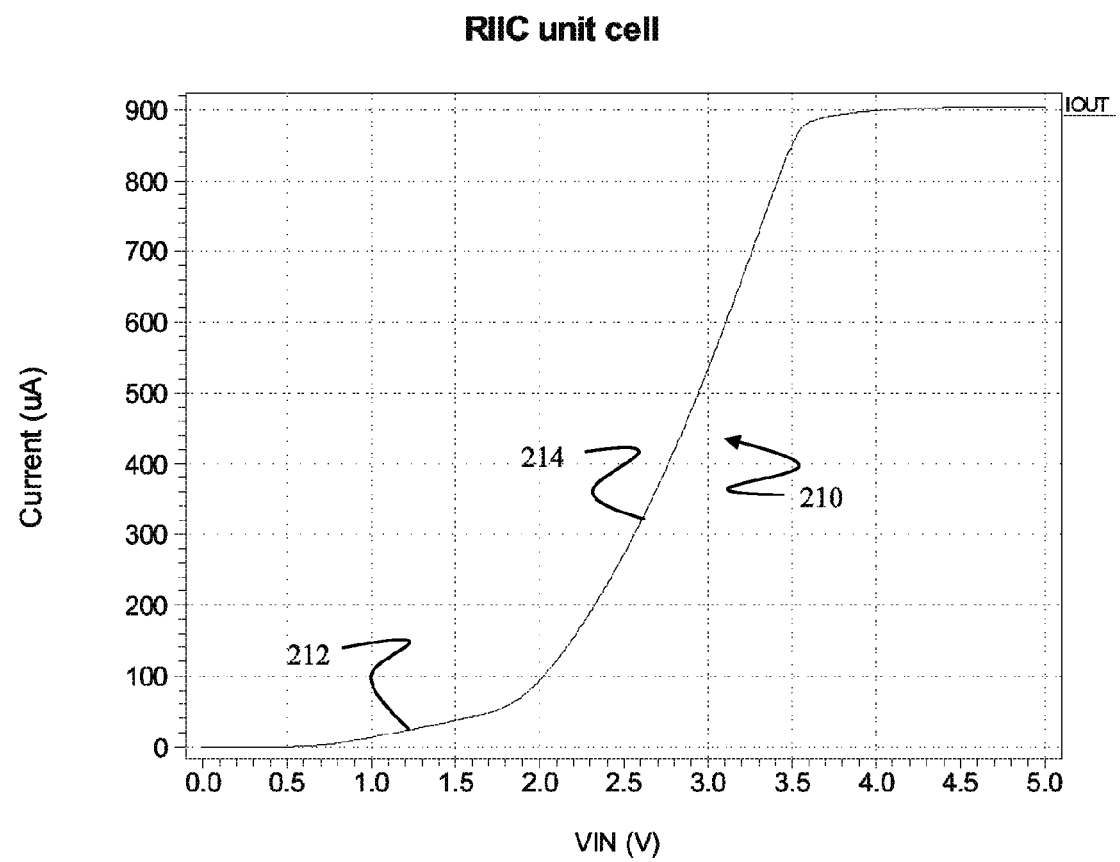
FIG. 2B is a graph of resulting current flow through the two drive resistors for supply of the emitter.

FIGS. 2A and 2B illustrate the dual-slope transfer curves obtained from this unit cell design. Two distinct regions of operation exist for this unit cell in which current is linearly related to a first range of the input voltage for small emitter currents allowing high resolution control of emitter temperature and exponentially related to the input voltage in a second range for large emitter currents for low resolution control of emitter temperature. FIG. 2A shows voltages of linear input buffer driving node VOUT (trace 216) with a substantially linear rise with the resulting M2 drain node VD (trace 218), and M1 drain node VE (trace 220). These regions can be tailored in terms of their slopes and transition points by altering the geometries of devices M1, M2 and R1. FIG. 2B shows the resulting emitter output current IOUT (trace 210), which incorporates a linear region 212 with respect to a first voltage range of about 0.5 to 2.0 V and an exponential region 214 with respect to a second voltage range of about 2.0 to 3.5 V for the control voltage at node VOUT.

Figure 3:
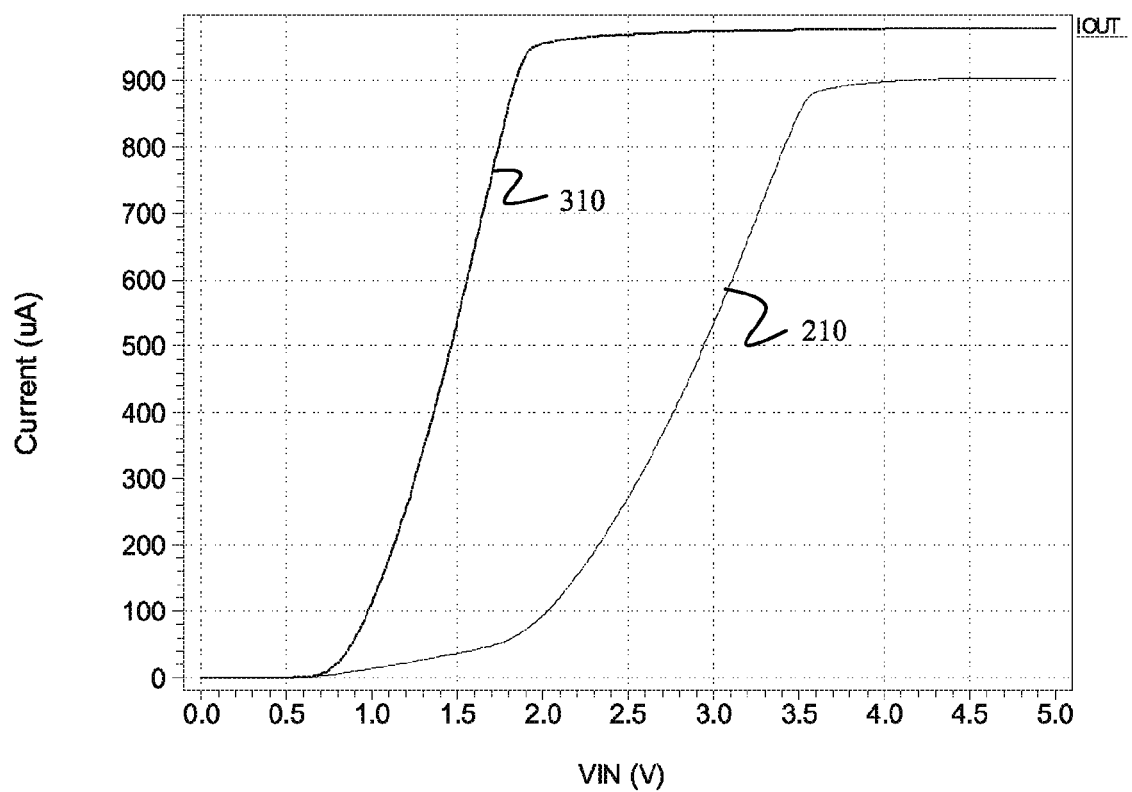
FIG. 3 is a graph of resulting current flow for the emitter with override of the linear input signal range.

The linear operation region can be eliminated by closing switch AN and opening switch AN* of FIG. 1, thus configuring M2 into triode mode since VG is pulled up to the CMOS positive rail while VD remains below the transistor saturation voltage due to the large channel conductance. This allows a peak IOUT current boost on the order of 10% when node VOUT reaches its maximum voltage and is useful for resistive type emitters that require annealing the material prior to normal operation. FIG. 3 illustrates this anneal mode boost with emitter output current, trace 310, with respect to control voltage at node VOUT shown in comparison with normal emitter output current, trace 210 as previously described with respect to FIG. 2A.

New technology high current emitter types require bias voltages across their terminals which are much larger than voltages available from standard CMOS positive and negative rails. For an exemplary embodiment VEE will be approximately 20V for VEE (current sink of the embodiment described subsequently with respect to FIG. 4A, assuming VGG=0V) and −15V for VCC (current source of the embodiment described subsequently with respect to FIG. 4B, assuming VAA=5V). Exemplary emitters for which the embodiments disclosed herein are applicable are available from and described by University of Iowa "Superlattice Light Emitting Diode" (SLED) array, Dr. Thomas Bogess, (319) 335-1689, thomas-boggess@uiowa.edu, Aerius/ATEC midwave infrared LED arrays, Dr. Chad Wang, Aerius Photonics, (805) 642-4645, cswang@acriusphotonics.com, KLABS SiC resistive emitting arrays, Dr. Kaiyan Zhang, KLABS Corporation, (908) 904-1400, kzhang@klabcorp.com, Cyan Systems Photonic Crystal emitting array, Mr. John Caulfield, Cyan Systems, (805) 453-0582, john@cyan-systems.com, Maxion Technologies midwave infrared LED arrays, Dr. John Bradshaw, Maxion Technologies, (301) 405-1090, jbradshaw@maxion.com, Power Photonics midwave infrared LED arrays, Dr. David Westerfeld, Power Photonics, davidwesterfeldyahoo.com, Santa Barbara Infrared resistive arrays, Mr. Jeff Smith, SBIR, 805-965-3669, jsmith@sbir.com, Acumen Scientific high temperature resistive arrays, Dr. Steve Solomon, Acumen, (805) 708-5084, Steve@AcumenScientific.com A large bias is required to ensure that adequate emitter current can be generated in order to achieve the desired emitter temperature, but also ensures that transistor M1 remains in saturation for large emitter currents. However, when IOUT~0, VE~VEE as shown for the circuits described above and this voltage is contacting the drain of M1. Thus transistor M1 must be able to tolerate potentials of up to VEE at this junction, yet VEE can be several times the CMOS positive rail potential. A special extended-drain MOS device such as that offered by the ON Semiconductor (formerly AMIS) foundry in their 0.5 um CMOS process, is employed in the embodiments shown for M1 such that the VE node can rise well above the breakdown voltage limit for standard MOS junctions. Proper sizing and efficient layout of M1 ensures adequate transconductance. Other CMOS processes, such as On Semi's I3T family of 0.35 um processes, could also be utilized for high-voltage extended-drain devices in the event that the unit cell is redesigned for smaller pitch.

Implementations of the exemplary circuit of FIG. 1 may be accomplished in either emitter current sink configuration using CMOS components as described above or as an emitter source configuration using MOS complements of transistors M1 and M2, i.e., PMOS in place of NMOS devices, with appropriate inversion of the remaining devices attached to nodes VGG up to VEE such that current can be sourced rather than sunk through an emitter with similar dual-slope function.

This configuration is particularly applicable for driving current through resistive as well as common-cathode diode emitters.

Figure 4A:
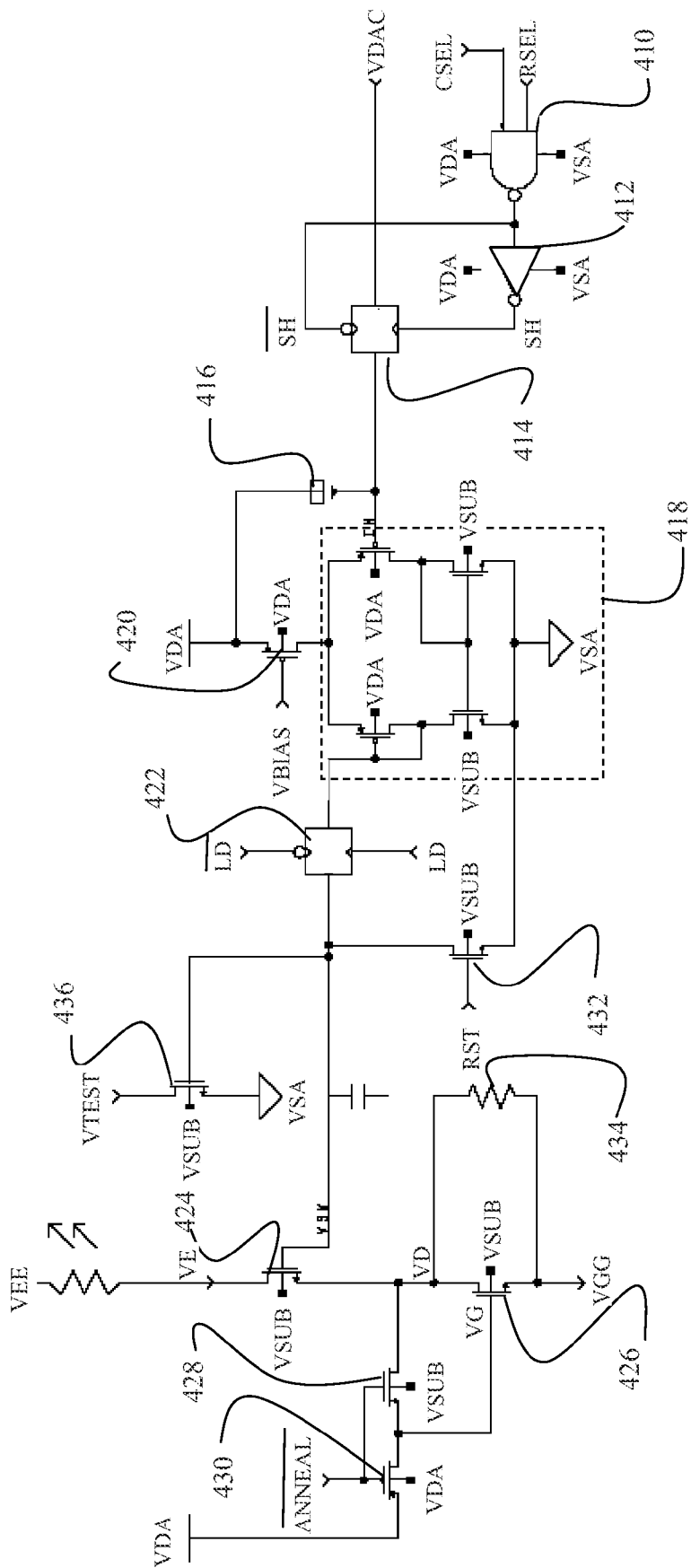
FIG. 4A is a schematic of the RIIC unit cell design of the exemplary generalized embodiment of FIG. 1 for emitter current sink configuration.

A CMOS implementation of an exemplary embodiment of the generalized configuration of FIG. 1 is shown in FIG. 4A wherein the AND for control of the first switch employs a NAND gate 410 receiving column and row select signals CSEL and RSEL. Output of NAND 410 is provided as SH complement and through an inverter 412 as SH to a sample and hold circuit 414 receiving input voltage VIN. The sampling capacitor 416 receives the output of the sample and hold. Linear amplifier 418 is connected to the sampling capacitor and is biased by transistor 420 from the CMOS upper rail voltage. A second sample and hold circuit 422 connected to an output of the linear amplifier receives LD and LD compliment signals for the second switch to supply the control signal to the first CMOS transistor 424 in the cascaded transistors for the emitter current sink. CMOS Transistor 426 is the serially connected transistor in the emitter current sink with a gate to drain connection through transistor 428 acting as the anneal switch cutoff with transistor 430 acting as the anneal switch activation for triode operation of transistor 426. Reset of the control voltage to the lower rail voltage is accomplished with transistor 432 interconnected between the output of sample and hold 422 and the gate of transistor 424. Resistor 434 acts as the channel for the linear current sink for the emitter in the first range of control voltage where transistor 426 is in saturation. A test port for the control voltage is provided through transistor 436.

Figure 4B:
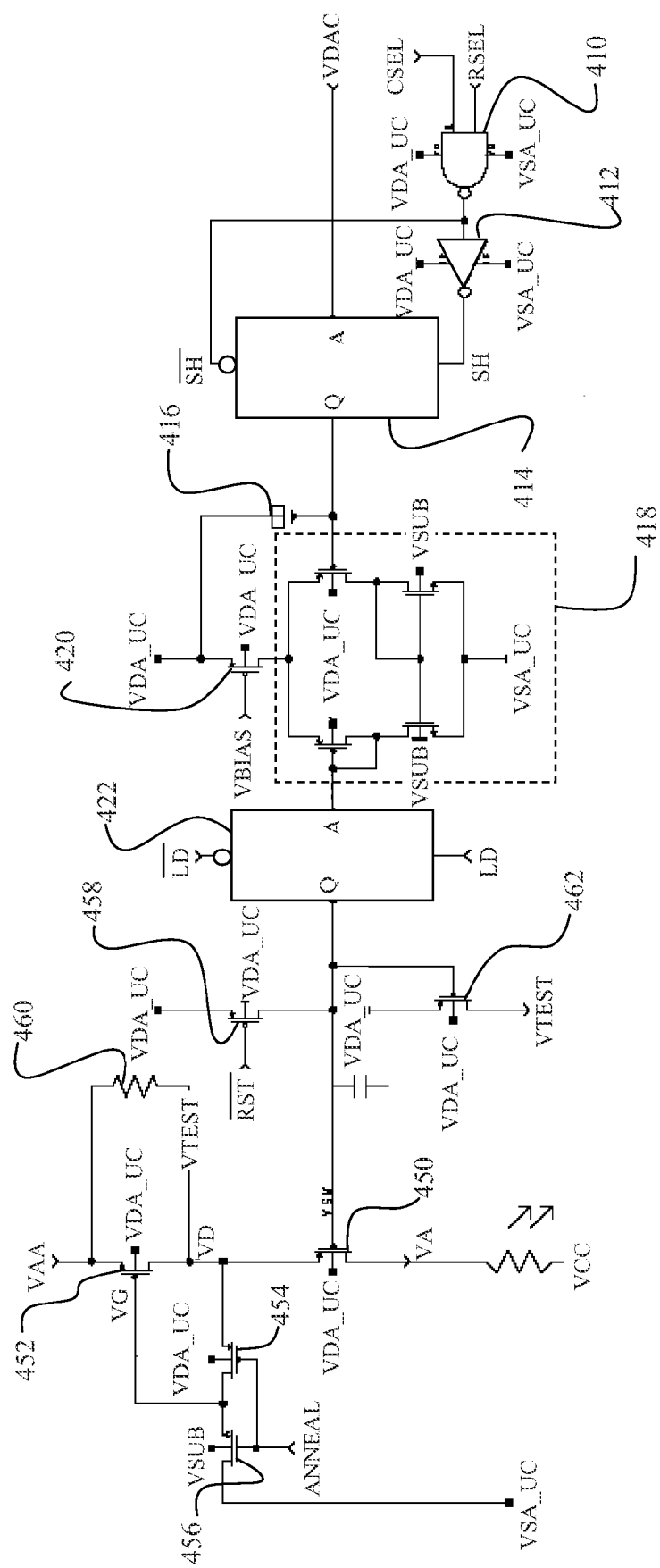
FIG. 4B is schematic of the RIIC unit cell design of the exemplary generalized embodiment of FIG. 1 for emitter current source configuration.

A MOS implementation of a second exemplary embodiment is shown in FIG. 4B wherein the signal sampling circuit for the input control voltage is substantially identical as that described above with respect to FIG. 4A with comparable component numbering. The second sample and hold circuit 422 supplies the control signal to the first MOS transistor 450 in the cascaded transistors for the emitter current source. MOS Transistor 452 is the serially connected transistor in the emitter current source with a gate to drain connection through transistor 454 acting as the anneal switch cutoff with transistor 456 acting as the anneal switch activation for triode operation of transistor 452. Reset of the control voltage to the upper rail voltage is accomplished with transistor 458 interconnected between the output of sample and hold 422 and the gate of transistor 450. Resistor 460 acts as the channel for the linear current sink for the emitter in the first range of control voltage where transistor 452 is in saturation. A test port for the control voltage is provided through transistor 462.

In FIGS. 4A and 4B the ANNEAL (or complement) signal serves as both AN and AN* signals discussed above since the signal controls paired PMOS and NMOS transistors as the switch.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A unit cell for high current emitter drive in a Read-In Integrated Circuit comprising:
   a signal sampling circuit creating a variable input signal having a desired range;
   a transistor cascade for emitter current supply having a first transistor receiving the input signal and a second transistor serially connected to the first transistor with a parallel resistor, said second transistor maintained in saturation for a first portion of the input signal range, the first transistor acting as a source follower for the first range of the input signal with linear current flow through said resistor, said second transistor departing saturation in a second portion of the range for the input signal resulting in saturation mode square-law behavior dominating the first transistor, causing a rapid increase in current through its channel.

2. The unit cell as defined in claim 1 wherein the signal sampling circuit comprises:
   a voltage input controlled by a first switch;
   a capacitor charged by the voltage input;
   a linear amplifier connected to the capacitor and providing an output through a second switch as the input signal for the first transistor.

3. The unit cell as defined in claim 2 a further comprising a reset switch to discharge the signal sampling circuit.

4. The unit cell as defined in claim 1 wherein the first and second transistor are current source devices.

5. The unit cell as defined in claim 1 wherein the first and second transistor are current sink devices.

6. The unit cell as defined in claim 1 further comprising a switch placing the second transistor in triode mode to eliminate linear current flow in the first portion of the input signal range.

7. The unit cell as defined in claim 1 wherein the first transistor is an extended-drain MOS device.

8. A method for high current emitter drive in a read-in integrated circuit unit cell comprising:
   providing a variable input voltage;
   providing an emitter current supply having a first transistor receiving the input voltage and a second transistor serially connected to the first transistor with a parallel resistor;
   maintaining the second transistor in saturation for a first portion of the input signal range, the first transistor acting as a source follower for the first range of the input signal with linear current flow through said resistor;
   departing saturation in the second transistor in a second portion of the range for the input signal; and
   causing saturation mode square-law behavior to dominate the first transistor for a rapid increase in current through its channel in the second portion of the range of the input signal.

9. The method as defined in claim 8 wherein providing a variable input voltage comprises:
   providing a variable voltage to a first switch;
   charging a capacitor by the voltage input upon actuation of the first switch;
   connecting a linear amplifier to the capacitor and
   providing an output through a second switch as the input voltage for the first transistor.

10. The method as defined in claim 9 further comprising activating a reset switch to discharge the signal sampling circuit.

* * * * *